United States Patent [19]
Capuano

[11] 4,252,168
[45] Feb. 24, 1981

[54] THREAD CONVOLUTION

[75] Inventor: Terry D. Capuano, Hinckley, Ohio

[73] Assignee: The Lamson & Sessions Co., Cleveland, Ohio

[21] Appl. No.: 39,736

[22] Filed: May 16, 1979

[51] Int. Cl.³ .............................................. F16B 39/30
[52] U.S. Cl. ................................................... 411/311
[58] Field of Search ............. 151/14 R, 22, 7; 85/46; 10/10 R

[56] References Cited

U.S. PATENT DOCUMENTS

| Re. 27,678 | 6/1973 | Orlomoski | 151/22 |
|---|---|---|---|
| 1,250,748 | 12/1917 | Woodward | 151/22 |
| 2,177,004 | 10/1939 | Purtell | 151/22 |
| 2,301,181 | 11/1942 | Ilsemann | 151/22 |
| 3,076,208 | 2/1963 | Moore | 151/22 X |
| 3,882,917 | 5/1975 | Orlomoski | 151/22 |
| 4,024,899 | 5/1977 | Stewart | 151/14 R |

*Primary Examiner*—Ramon S. Britts

[57] ABSTRACT

An improved lock thread convolution has a resiliently deflectable spring rib or projection which presses a load bearing or pressure flank of the lock thread convolution against the flank of a mating thread. The pressure between the two flanks retards rotation between the lock thread convolution and the mating thread. In addition, the flank pressure retards axial movement between the threads upon application of vibrating or oscillating loads to the threads. The resiliently deflectable spring rib or projection has a base which is integrally formed with the crest of the lock thread convolution and an arcuately curving body which extends away from the crest along the nonpressure or unloaded flank of the lock thread convolution. The spring projection is deflected by engagement of a side surface area of the projection with the flank of the mating thread to provide a resilient spring force urging the pressure or load flank on the opposite side of the lock thread convolution into abutting engagement with a flank surface of the mating thread convolution.

23 Claims, 5 Drawing Figures

THREAD CONVOLUTION

BACKGROUND OF THE INVENTION

This invention relates to a new and improved thread convolution. More specifically, the invention relates to a lock thread convolution having a resiliently deflectable spring rib or projection which cooperates with a mating thread to provide a locking action which retards relative rotation between the lock thread convolution and the mating thread.

It has been proposed that a locking action could be obtained between a lock thread convolution and a mating thread by providing burrs or points which extend from the crest of the lock thread convolution. These burrs engage the flank of a mating thread to prevent relative rotation between the threads. The burrs are sharply pointed and extend transversely to the flank of the mating thread so that the burrs gouge or cut into the mating thread. The manner in which such a thread convolution may be formed is disclosed in U.S. Pat. No. 3,076,208. Due to a lack of flexibility in the burrs and resulting damage to a mating thread, the lock thread convolution disclosed in this patent has limited reusability.

Another known lock thread is provided with a pair of tangs or projections which extend outwardly from opposite flanks of the lock thread. These tangs or projections cooperate with the flanks of a mating thread to center the lock thread convolution midway between the flanks of the mating thread. When a load is applied to the thread convolutions, the tangs on the load or pressure flank side of the lock thread convolution are compressed while the tangs on the opposite side of the lock thread tend to move away from the cooperating flank of the mating thread. The tangs are formed by sharply cutting into the body of the lock thread in such a manner as to induce sharp stress concentrating discontinuities in the body of the lock thread. The manner in which this known lock thread is formed and cooperates with an internal thread is disclosed in U.S. Pat. No. Re. 27,678. Due to the relatively thin configuration of the tangs, it is difficult to manufacture this lock thread with commercially acceptable tooling.

SUMMARY OF THE INVENTION

The present invention is directed to a new and improved lock thread convolution. The lock thread convolution has a resiliently deflectable spring rib or projection which presses a load or pressure flank of the lock thread convolution firmly against the flank of a mating thread. The pressure between the two thread flanks results in a friction force which retards relative rotation between the threads. In addition, the resiliently deflectable rib or projection loads the two threads in such a manner as to retard axial movement between the threads whey then are subjected to axially varying load forces.

The resiliently deflectable spring rib has a base which extends across the crest of the lock thread convolution. The rib curves or bends away from the crest of the lock thread convolution along the non-pressure or unloaded flank portion of the lock thread convolution to a free end portion.

When the lock thread convolution moves into engagement with a mating thread convolution, a tapered leading end portion of the longitudinally extending rib moves into engagement with a flank surface of the mating thread. Continued rotation between the two threads causes a side surface area of the resiliently deflectable rib to press against the flank of the mating thread and deflect the rib inwardly toward the non-pressure or unloaded flank portion of the lock thread convolution. This results in a spring force which presses the opposite or load flank on the lock thread convolution firmly against the flank of a mating thread convolution.

Accordingly, it is an object of this invention to provide a new and improved thread convolution having a resiliently deflectable projection which is effective to press a flank surface of the thread convolution against the flank of a mating thread.

Another object of this invention is to provide a new and improved thread convolution having a longitudinally extending and resiliently deflectable rib which projects from the crest toward the root of the thread convolution, the rib being resiliently deflectable toward a flank of the thread convolution under the influence of forces applied against the rib by a mating thread.

BRIEF DESCRIPTION OF THE DRAWINGS

The foregoing and other objects and features of the present invention will become more apparent upon consideration of the following description taken in connection with the accompanying drawings wherein.

DESCRIPTION OF ONE SPECIFIC PREFERRED EMBODIMENT OF THE INVENTION

Figure 1:
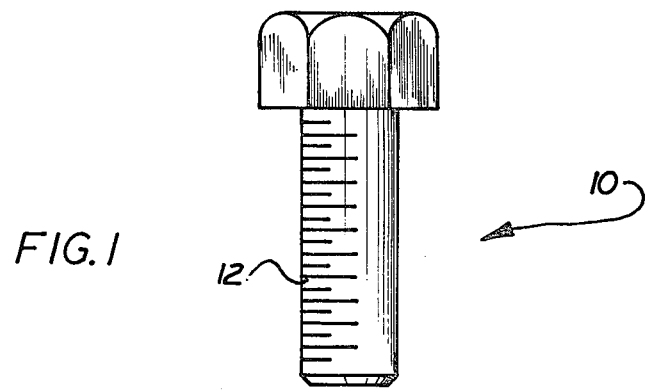
FIG. 1 is an illustration of a bolt having both standard threads and a lock thread convolution formed in accordance with the present invention.

A metal bolt 10 (FIG. 1) has a helical external thread 12 which includes both standard thread convolutions and at least one lock thread convolution 14 (FIG. 2) which is constructed in accordance with the present invention. The lock thread convolution 14 has a resiliently deflectable projection or rib 16 which acts as a spring to press a helical load or pressure flank surface 18 into firm abutting engagement with the helical flank surface 20 (FIG. 3) of a mating thread 22. To provide a spring force pressing the load flank surface 18 of the lock thread convolution 14 against the flank 20 of the mating thread 22, the rib or projection 16 is resiliently deflectable from the initial or unrestrained position of FIG. 2 to the deflected position of FIG. 3 by engagement of an outer side surface 26 on the rib or projection 16 with a flank surface 28 of the mating thread 22.

The pressure between the load flank surface 18 of the lock thread convolution 14 and the flank surface 20 of the mating thread 22 retards relative rotation between the fastener 10 and the mating thread. In addition, the spring force provided by deflection of the rib or projection 16 holds the fastener 10 against axial movement relative to the mating thread 22 if the fastener is subjected to a vibrator or oscillating load.

The spring rib or projection 16 is integrally formed with a body 30 of the lock thread convolution 14. The spring rib or projection 16 has a base 32 (FIG. 2) which extends across the crest portion 34 of the lock thread convolution 14. An arcuate body 38 of the rib 16 extends outwardly from the crest 34 and curves inwardly toward a helical root portion 40 of the lock thread convolution 14.

The cantilevered body 38 of the resiliently deflectable rib or projection 16 tapers from the base 32 to a free end or nose 42. The spring rib 16 has an arcuate outer side surface 44 which is formed as a continuation of the flank surface 18. The surface area 26, which abuts the flank surface 28 of the mating thread 22 (see FIG. 3), is part of the arcuately curving outer side surface 44. It should be noted that the outer side surface 44 of the rib 16 extends tangentially from the flank surface 18. Therefore, there are no stress concentrating discontinuities at the junction between the spring rib 16 and flank surface 18. In addition, the body 38 of the rib 16 has a continuously curving inner surface 48 which faces inwardly toward a inner surface or unloaded flank 52 of the lock thread convolution 14.

Figure 4:
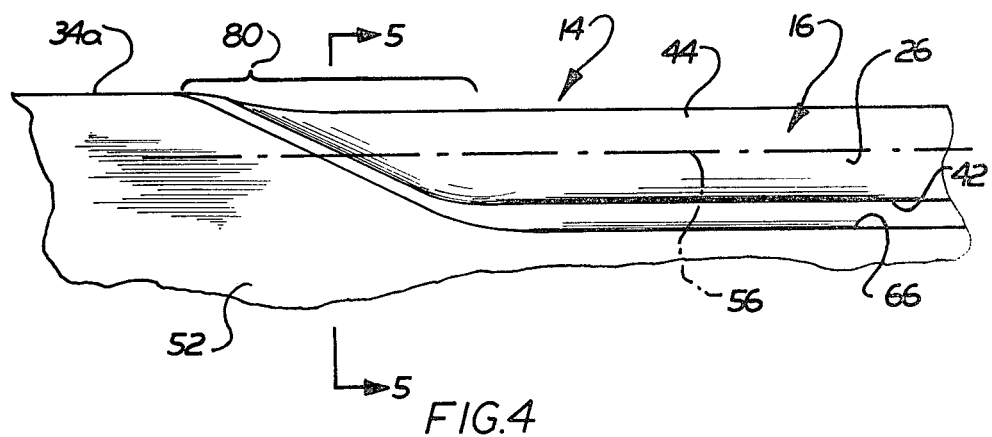
FIG. 4 is an expanded plan view, taken generally along the lines 4—4 of FIG. 3 and illustrating the longitudinally extending configuration of the resiliently deflectable rib.

The resiliently deflectable spring rib or projection 16 extends longitudinally along the non-pressure or unloaded flank 52 of the thread convolution 14 in the manner illustrated in FIG. 4. It should be understood that FIG. 4 is a laid-out or projected view along the helical flank 52 of the thread convolution 14. The rib 16 extends along the flank 52 in a direction parallel to the helical crest 34 of the thread convolution 14.

Figure 2:
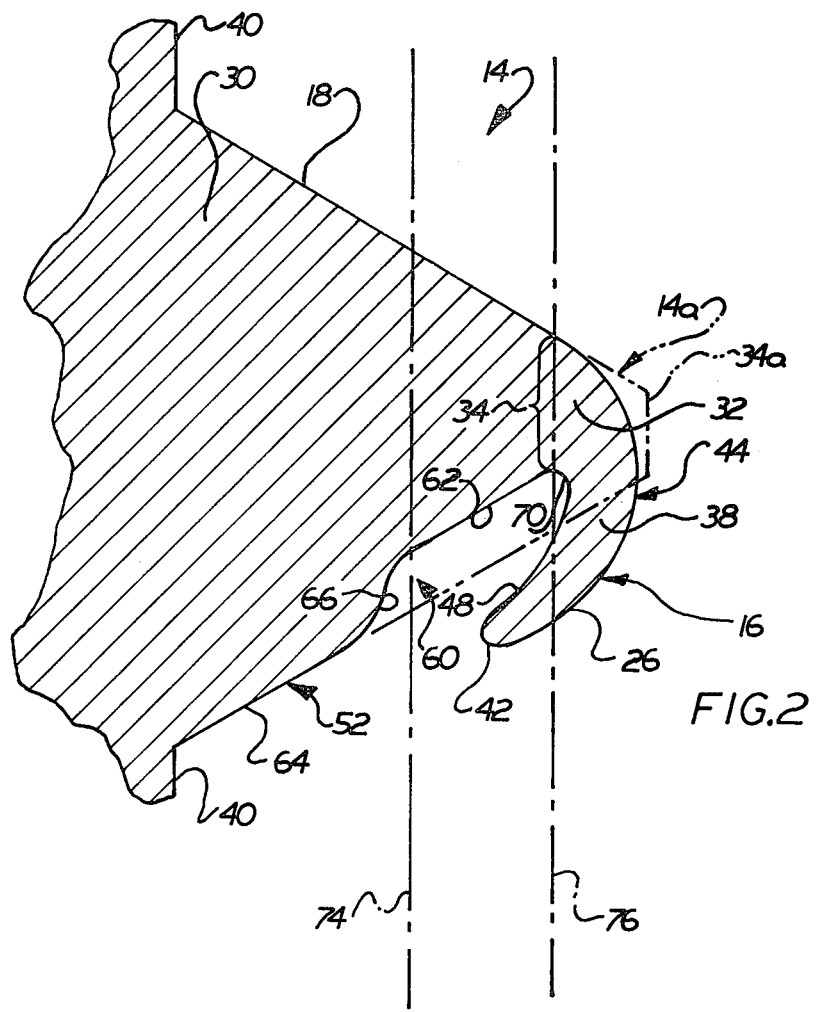
FIG. 2 is an enlarged radial sectional view illustrating the manner in which a resiliently deflectable rib or projection extends from the crest of the lock thread convolution.
Figure 3:
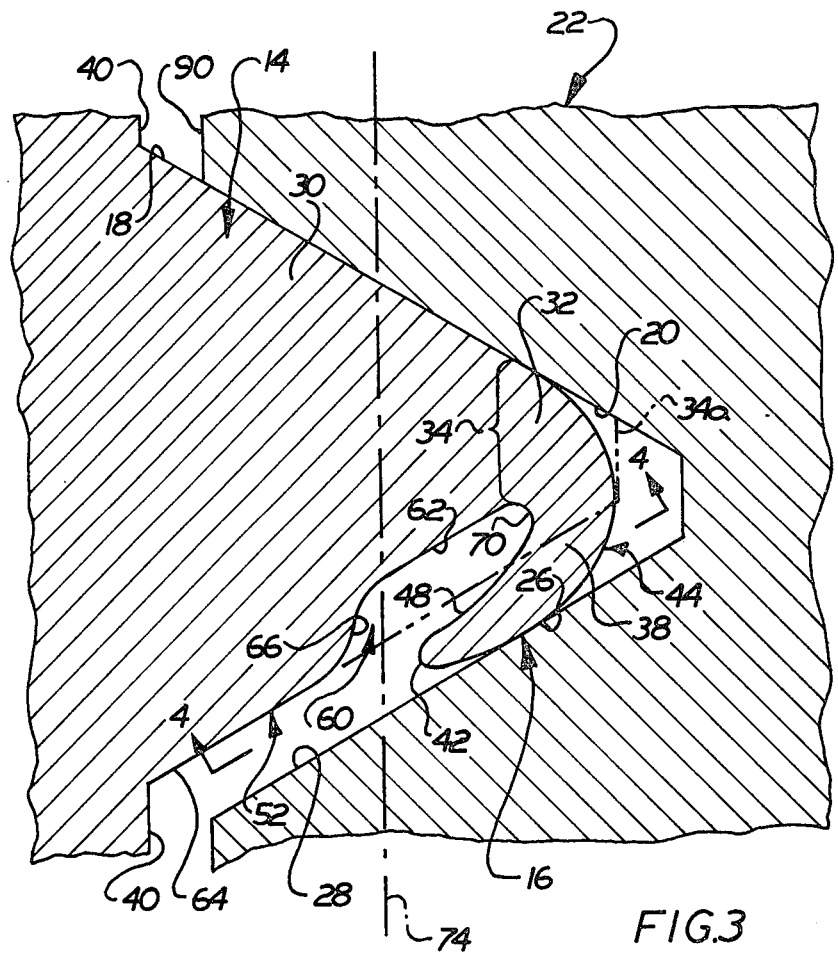
FIG. 3 is a radial sectional view, generally similar to FIG. 2, illustrating the manner in which the lock thread convolution engages a mating thread.

When the rib 16 is formed, the crest height of the thread convolution 14 is reduced from the standard crest height, which is in dashed lines at 34a FIG. 2, to the reduced crest height 34, indicated by the bracket in FIG. 2. However, the rib 16 has a longitudinally extending helical central axis 56 (see FIG. 4) which extends parallel to the crest 34 (FIG. 2) of the thread convolution 14. The helical nose or free end 42 of the rib 16 also extends parallel to the crest 34.

The longitudinal extent of the spring rib 16 is determined by the magnitude of the locking force desired between the external thread 12 on the bolt 10 and the mating internal thread 22. Thus, the rib 16 could, if desired, extend for a plurality of turns of bolt thread 12 or could even extend for the entire length of the thread. On the other hand, the spring rib 16 could have a relatively short longitudinal extent which would be less than a full turn of the thread convolution 14. If the rib 16 is formed with a relatively short length which is less than a full turn, it may be desirable to form a plurality of separate ribs on different convolutions of the external thread 12. However, it is preferred to form the rib 16 with a length which extends for a few turns of the external thread 12 in order to provide an adequate locking action. The remainder of the threads 12 have a standard configuration and freely engage a standard mating internal thread. In order to facilitate engagement of the external thread 12 with the internal thread 22, the first few turns of the external thread 12 have a standard configuration.

Although the thread convolution 14 could be formed in many different ways, it is believed to be commercially advantageous to roll the lock thread convolution 14 on a bolt flank simultaneously with a standard thread convolution. To facilitate such a rolling operation, the volume of metal contained in the thread convolution 14 is the same as is contained in a standard thread convolution, indicated in dashed lines at 14a in FIG. 2. In order to form the arcuately curving projection or rib 26, metal from within the envelope of the standard thread convolution 14a is displaced by a rolling action to form the rib 16 as a continuation of the flank 18. Once the rib has been formed in this manner, it is bent or curved inwardly to the initial position shown in FIG. 2. Although it is believed to be commercially advantageous to bend the projection 16 to the position shown in FIG. 2 by continuing to roll the thread convolution on the same dies as were utilized to initially form the projection 16, it is contemplated that the projection 16 could be deflected back to the position shown in FIG. 2 in other ways if desired.

Since the thread convolution 14 is formed from the same volume of metal as is contained in the envelope of the standard thread convolution 14a (FIG. 2), a helical recess 60 is formed in the non-pressure or unloaded flank 52 of the thread convolution 14 to provide material for forming the projection 16. The recess 60 has a length which is approximately the same as the length of the spring rib 16. The recess 60 has a bottom surface 62 which in the illustrated embodiment extends generally parallel to a flat flank surface 64 which is located in the same plane as the flank surface of a standard thread convolution. The recess has a longitudinally extending sidewall 66 which interconnects the flank surface 64 and the bottom surface 62 of the recess 60. The recess 60 also has a longitudinally extending outer sidewall 70 which is disposed on the body 38 of the spring rib 16. The two sidewalls 66 and 70 extend parallel to the helical crest 34 of the thread convolution 14. It should be noted that the longitudinally extending sidewalls 66 and 70 of the recess 60 are continuously curving to eliminate stress concentrating discontinuities. If desired, the length of the bottom surface 62 could be decreased and the recess 60 formed with a more arcuate configuration.

The size of the recess 60 is determined by the volume of metal in the resiliently deflectable rib 16. In the illustrated embodiment of the invention, the free end or nose 42 of the rib 16 is disposed approximately midway between an imaginary cylinder, indicated at 74 in FIG. 2, having a pitch diameter equal to the pitch diameter of the standard thread convolution 14a and a second imaginary cylinder having a diameter equal to the crest diameter of the lock thread convolution 16. This second imaginary cylinder is indicated by the dashed line 76 in FIG. 2. The imaginary cylinder 76 is disposed in a coaxial relationship with the cylinder 74.

In order to prevent galling and the forming of discontinuities in the internal threads 22 when the thread convolution 14 is moved into engagement with the internal threads, the spring rib 16 has a leading end portion 80 (see FIG. 4) which tapers gradually from the configuration of a standard external thread convolution to the cross sectional configuration illustrated in FIG. 2. This gradual taper at the leading end portion 80 of the spring rib 16 enables the spring rib to be cammed inwardly with a sliding action as the spring rib initially engages the flank 28 (FIG. 3) of the internal thread 22. Although the leading end portion 80 of the spring rib projects outwardly from an envelope of a standard external thread convolution, at least part of the leading end portion 80 does not engage the flank surface 28 of the mating internal thread convolution 22 (FIG. 5).

Figure 5:
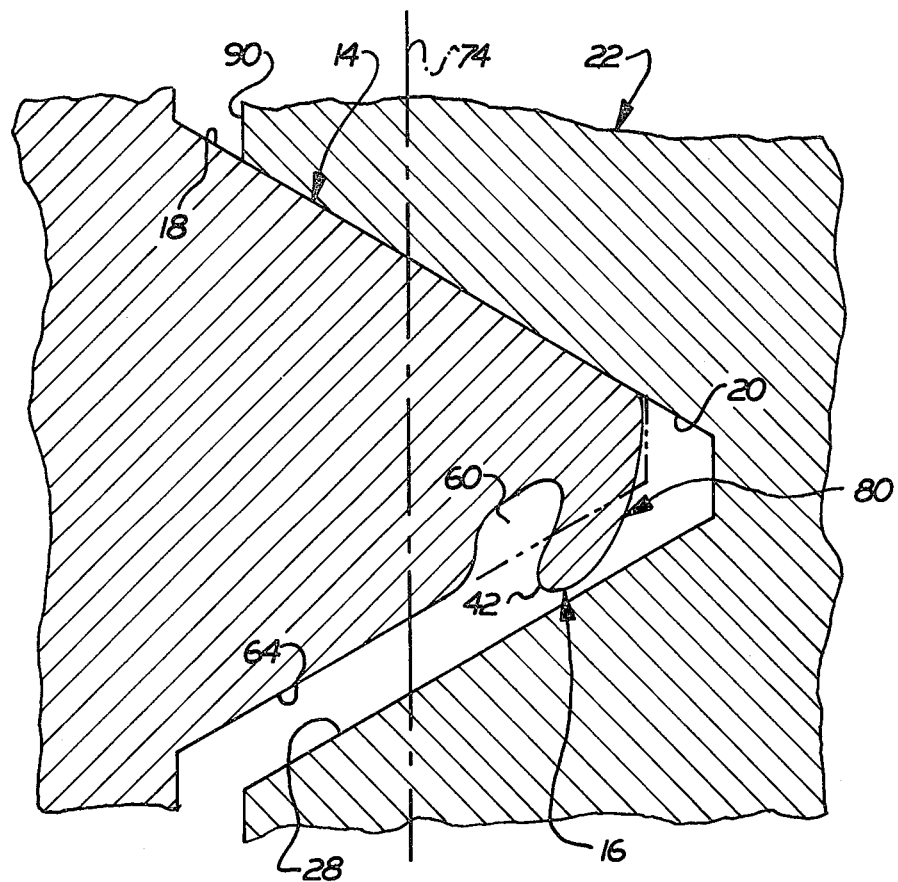
FIG. 5 is a radial sectional view, generally similar to FIG. 3, illustrating the manner in which a longitudinal end portion of the rib is tapered to promote smooth engagement with the mating thread.

In the leading end portion 80 of the spring rib 16, the spring rib is initially formed with a partially developed projection extending outwardly from the envelope of a standard external thread convolution (FIG. 5). Although the tolerances between the various thread convolution will vary, it is contemplated that the partially developed spring rib 16 in the leading end portion 80 will gradually increase in the extent to which it projects outwardly from the standard thread envelope so that the leftward (as viewed in FIG. 4) portion of the spring rib is not effective to engage the flank 28 as standard internal thread convolution (see FIG. 5) while subsequent portions of the rib are developed to such an extent that they will taper into engagement with the mating thread.

The crest of leading end portion 80 of the rib 16 tapers inwardly from the crest 34a of the portion of the thread having a standard configuration (see FIG. 4). Thus, the distance between the free end 42 and a helical line representing an extension of the crest 34a of the standard thread convolution gradually increases in the leading end portion 80 of the spring rib. Although it is preferred to form the spring rib with a tapered leading end portion as shown in FIGS. 4 and 5, it is contemplated that the leading end portion 80 could be formed in other ways. For example, the leading end portion 80 could be fully formed if desired and could be permanently pressed inwardly by permanently bending the spring rib into the recess 60. This would result in a tapered configuration which would also tend to prevent the formation of discontinuities in the internal thread convolution 22. In addition, it is contemplated that the thread convolution 14 could be formed as an internal thread convolution if desired.

In view of the foregoing it is apparent that the lock thread convolution 14 has a resiliently deflectable spring rib or projection 16 which presses a load or pressure flank 18 of the lock thread convolution in firm abutting engagement with the flank surface 20 of the mating thread convolution 22 throughout an area which extends from a crest 90 of the mating thread convolution to the crest 34 of the lock thread convolution 14. The pressure between the two abutting flanks surfaces 18 and 20 results in a friction force which retards relative rotation between the lock thread convolution 14 and the mating thread 22. In addition, the spring load applied to the lock thread convolution 14 by the rib 16 holds the flank surface 18 of the lock thread convolution 14 in abutting engagement with the flank surface 20 on the internal thread convolution during the application of vibration or oscillatory loads to the internal and external threads.

The resiliently deflectable spring rib 16 has a base 32 which extends across the crest 34 of the lock thread convolution 14 and is integrally formed with the body 30 of the lock thread. The rib 16 curves or bends away from the crest 34 of the lock thread convolution along the non-pressure or unloaded flank portion 52 of the lock thread convolution to a free end portion 42. When the spring rib 16 is in the initial or unrestrained condition of FIG. 2, a side surface area 26 on the spring rib extends transversely to the flank surface 64 of the thread convolution.

When the lock thread convolution 14 moves into engagement with a mating thread convolution 22 (FIG. 3), a tapered leading end portion 80 (FIG. 4) of the longitudinally extending spring rib 16 moves into engagement with a flank surface 28 of the mating thread 22. Continued relative rotation between the lock thread 14 and internal threads 22 causes the side surface area 26 to press against the flank surface 28 to deflect the rib 16 inwardly toward the non-pressure or unloaded flank portion 52 of the lock thread convolution 14. As this occurs, the surface area 26 moves into flat abutting engagement with the flank surface 28 of the mating thread convolution and is therefore substantially parallel to the flank surface 64 of the lock thread convolution 14. The spring pressure force between the longitudinally extending surface area 26 on the spring rib 16 presses the opposite or load flank 18 on the lock thread convolution 14 firmly against the flank 20 of the mating internal thread 22.

The magnitude of the pressure force between the flank surfaces 18 and 20 depends upon the extent to which the spring rib 16 is deflected inwardly by engagement of the spring rib with the flank surface 28 of the internal thread 22. Thus, if the pressure force between the flank surfaces 18 and 20 is to be increased, the distance which the spring rib 16 projects outwardly from the non-pressure or unloaded flank portion 52 of the lock thread convolution would be increased. Similarly, if the pressure force between the flank surfaces 18 and 20 is to be reduced, the distance between the inner side surface 48 of the spring rib 16 and the flank portion 52 of the lock thread convolution 14 would be reduced. Of course, the overall locking action obtained between the thread convolution 14 and the mating thread 22 can be varied by varying the longitudinal extent of the spring rib 16.

Having described one specific preferred embodiment of the invention, the following is claimed:

1. A thread convolution adapted to engage a mating thread, said thread convolution comprising root and crest portions, first and second flanks extending between said root and crest portions, and a resiliently deflectable cantilevered rib which extends longitudinally along said second flank, said cantilevered rib having a base which is fixedly connected with the crest portion of said thread convolution, a longitudinally extending free end portion which extends parallel to said crest portion and is disposed closer to the root portion of said thread convolution than is the base of said rib, and first and second side surfaces which extend between the base and free end portion, at least a portion of said first side surface facing inwardly toward and spaced apart from said second flank, at least a portion of said second side surface facing outwardly away from said second flank, said cantilevered rib being resiliently deflectable toward said second flank under the influence of forces applied against said second side surface of said rib by the mating thread to tend to retard relative movement between said thread convolution and the mating thread.

2. A thread convolution as set forth in claim 1 wherein said first flank includes a flank surface which extends between the root and crest portions of said thread convolution, said second side surface being formed as a continuation of said flank surface.

3. A thread convolution as set forth in claim 2 wherein said second side surface includes an arcuately curving portion which extends across the crest portion of said thread convolution.

4. A thread convolution as set forth in claim 3 wherein said first side surface includes an arcuately curving portion which extends from said second flank toward said free end portion of said rib.

5. A thread convolution as set forth in claim 4 wherein said arcuately curving portion of said first side surface has a smaller radius of curvature than said arcuately curving portion of said second side surface.

6. A thread convolution as set forth in claim 4 wherein said rib has a longitudinal end portion which tapers outwardly from said second flank to enable said rib to engage the mating thread without forming discontinuities in the mating thread.

7. A thread convolution as set forth in claim 1 wherein said second flank includes surface means for defining a longitudinally extending recess disposed inwardly of said rib and having a length which is as long as said rib.

8. A thread convolution adapted to engage a mating thread, said thread convolution comprising first and second flank portions disposed on opposite sides of said thread convolution and extending between root and crest portions of said thread convolution, said first flank portion including a flank surface adapted to abuttingly engage a flank surface of the mating thread, and spring means extending from the crest portion of said thread convolution for pressing said flank surface of said thread convolution against the flank surface of the mating thread throughout an area of abutting engagement which extends between the crest portion of said thread convolution and a crest portion of the mating thread, said spring means including a resiliently deflectable projection having a body which extends along said second flank portion of said thread convolution to a free end portion of said resiliently deflectable projection, said body of said spring portion extends from a base connected with the crest portion of said thread convolution toward the root portion of said thread convolution so that said free end portion of said body is disposed closer to the root portion of said thread convolution than is said base, said body of said resiliently deflectable projection including side surface means for abuttingly engaging a flank surface of the mating thread, said resiliently deflectable projection being movable toward said second flank portion from an initial position to a second position under the influence of forces applied against said side surface means of said resiliently deflectable projection by the mating thread.

9. A thread convolution as set forth in claim 8 wherein said side surface means on said projection is formed as a continuation of said flank surface of said first flank portion, said side surface means including an arcuately curving portion which extends across the crest portion of said thread convolution and a side surface area which is disposed between said arcuately curving portion of said surface means and said free end portion of said resiliently deflectable projection, said side surface area being adapted to engage a flank surface of the mating thread.

10. A thread convolution as set forth in claim 9 wherein said second flank portion includes a second flank surface which extends outwardly from the root portion of said thread convolution, said side surface area of said resiliently deflectable projection extending transversely to said second flank surface when said resiliently deflectable projection is in the initial position and extending parallel to said second flank surface when said resiliently deflectable projection is in the second position.

11. A thread convolution adapted to engage a mating thread, said thread convolution comprising first and second flank portions disposed on opposite sides of said thread convolution and extending between root and crest portions of said thread convolution, said first flank portion including a flank surface adapted to abuttingly engage a flank surface of the mating thread, and spring means extending from the crest portion of said thread convolution for pressing said flank surface of said thread convolution against the flank surface of the mating thread throughout an area of abutting engagement which extends between the crest portion of said thread convolution and a crest portion of the mating thread, said spring means including a resiliently deflectable projection having a body which extends along said second flank portion of said thread convolution to a free end portion of said resiliently deflectable projection, said body of said resiliently deflectable projection including side surface means for abuttingly engaging a flank surface of the mating thread, said resiliently deflectable projection being movable toward said second flank portion from an initial position to a second position under the influence of forces applied against said side surface means of said resiliently deflectable projection by the mating thread, second flank portion including a second flank surface which extends outwardly from the root portion of said thread convolution and means defining a recess which extends outwardly from said second flank surface to the crest portion of said thread convolution, said means defining a recess including a bottom surface and a first side surface area extending between said bottom surface and said second flank surface and a second side surface area on the body of said resiliently deflectable projection, said free end portion of said resiliently deflectable projection being disposed between said first side surface area of said recess and said second side surface area on said body of said projection.

12. A thread convolution as set forth in claim 11 wherein said free end portion of said resiliently deflectable projection is disposed between an imaginary cylinder having a diameter equal to the pitch diameter of said thread convolution and an imaginary cylinder having a diameter equal to the diameter of the crest portion of said thread convolution.

13. A thread convolution as set forth in claim 11 wherein said resiliently deflectable projection includes a base portion which extends across the crest portion of said thread convolution and an arcuate body portion which curves away from said first flank portion toward said second flank portion.

14. A thread convolution as set forth in claim 11 wherein said body of said projection extends from a base connected with the crest portion of said thread convolution toward the root portion of said thread convolution so that said free end portion of said body is disposed closer to the root portion of said thread convolution than is said base.

15. A thread convolution as set forth in claim 11 wherein said side surface means on said projection is formed as a continuation of said flank surface of said first flank portion, said side surface means including an arcuately curving portion which extends across the crest portion of said thread convolution and a side surface area which is disposed between said arcuately curving portion of said surface means and said free end portion of said resiliently deflectable projection, said side surface area being adapted to engage a flank surface of the mating thread.

16. A thread convolution as set forth in claim 15 wherein said side surface area of said resiliently deflectable projection extends transversely to said second flank surface when said resiliently deflectable projection is in the initial position and extends parallel to said second flank surface when said resiliently deflectable projection is in the second position.

17. A thread convolution adapted to engage a mating thread having first and second flank surfaces, said thread convolution comprising first and second flank portions disposed on opposite sides of said thread convolution and extending between root and crest portions of said thread convolution, said first flank portion including a first flank surface adapted to abuttingly engage the first flank surface of the mating thread, and a resiliently deflectable projection having a first side surface which is engageable with the second flank surface of the mating thread and a second side surface, said first side surface of said projection curves arcuately from a tangent intersection with said first flank surface across the crest portion of said thread convolution and extends toward the root portion of said thread convolution to a free end portion of said projection, said second side surface of said projection curves arcuately from a tangent intersection with said second flank portion and extends toward the root portion of said thread convolution to the free end of said projection, said first side surface of said projection being engageable with the second flank surface of the mating thread to press said first flank surface of said thread convolution against the first flank surface of the mating thread.

18. A thread convolution as set forth in claim 17 wherein the free end portion of said projection is located between the root portion of said thread convolution and a line extending through the intersection of said first flank surface with said first side surface of said projection and through the intersection of said second flank portion with said second side surface, said line being disposed in a plane which contains and extends radially from a central axis of said thread convolution.

19. A thread convolution as set forth in claim 17 wherein the arcuately curving portion of said second side surface has a radius of curvature which is smaller than the radius of curvature of the arcuately curving portion of said first side surface.

20. A thread convolution as set forth in claim 17 wherein said second flank portion includes a second flank surface which extends outwardly from the root portion of said thread convolution and means defining a recess, said means defining a recess including a bottom surface and a surface extending between said bottom surface and said second flank surface, said tangent intersection of said second side surface of said projection with said second flank portion being formed at an intersection of said second side surface with said bottom surface of said recess.

21. A thread convolution adapted to engage a mating thread having first and second flank surfaces, said thread convolution comprising first and second flank portions disposed on opposite sides of said thread convolution and extending between root and crest portions of said thread convolution, said first flank portion including a first flank surface adapted to abuttingly engage a first flank surface of the mating thread, said second flank portion including a second flank surface extending from the root portion toward the crest portion of said thread convolution and means defining a recess extending from said second flank surface to the crest portion of said thread convolution and extending from said second flank surface toward said first flank surface, said recess including a bottom surface and a side surface extending between said bottom surface and said second flank surface, a resiliently deflectable projection having first and second side surfaces, said first side surface of said projection curving arcuately from a tangent intersection with said first flank surface across the crest portion of said thread convolution, said second side surface of said projection curving arcuately from a tangent intersection with said bottom surface of said recess and extends to the free end portion of said projection.

22. A thread convolution as set forth in claim 21 wherein said bottom surface of said recess extends parallel to said second flank surface.

23. A thread convolution as set forth in claim 21 wherein said first side surface of said projection includes surface means for abuttingly engaging the second flank surface of said mating thread at a location on a side of said thread convolution opposite to the tangent intersection of said first side surface of said projection with said first flank surface of said thread convolution.

* * * * *

UNITED STATES PATENT AND TRADEMARK OFFICE
CERTIFICATE OF CORRECTION

PATENT NO. : 4,252,168
DATED : February 24, 1981
INVENTOR(S) : Terry D. Capuano

It is certified that error appears in the above-identified patent and that said Letters Patent are hereby corrected as shown below:

Column 7, line 34, change "portion" to --means--.

Signed and Sealed this

Seventeenth Day of November 1981

[SEAL]

Attest:

GERALD J. MOSSINGHOFF

Attesting Officer

Commissioner of Patents and Trademarks